United States Patent
Gao et al.

(10) Patent No.: US 10,960,909 B2
(45) Date of Patent: Mar. 30, 2021

(54) AUTOMATIC TRAIN PROTECTION METHOD, VEHICLE ON-BOARD CONTROLLER AND TRAIN BASED ON VEHICLE-VEHICLE COMMUNICATION

(71) Applicant: Traffic Control Technology Co., Ltd, Beijing (CN)

(72) Inventors: Chunhai Gao, Beijing (CN); Qiang Zhang, Beijing (CN); Junguo Sun, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 695 days.

(21) Appl. No.: 15/823,343

(22) Filed: Nov. 27, 2017

(65) Prior Publication Data
US 2019/0144025 A1 May 16, 2019

(30) Foreign Application Priority Data
Nov. 14, 2017 (CN) .......................... 201711123797.4

(51) Int. Cl.
*B61L 27/00* (2006.01)
*B61L 25/02* (2006.01)
(Continued)

(52) U.S. Cl.
CPC ............ *B61L 27/0077* (2013.01); *B61L 3/008* (2013.01); *B61L 21/10* (2013.01); *B61L 23/34* (2013.01);
(Continued)

(58) Field of Classification Search
CPC ...... B61L 27/0077; B61L 21/10; B61L 3/008; B61L 27/04; B61L 25/023; B61L 23/34;
(Continued)

(56) References Cited

U.S. PATENT DOCUMENTS 6,135,396 A * 10/2000 Whitfield ................ B61L 3/125
246/167 R
2003/0169203 A1* 9/2003 Franckart .............. B61L 25/025
342/457
(Continued)

FOREIGN PATENT DOCUMENTS

CN 105292184 A 2/2016
CN 105329264 A 2/2016
(Continued)

OTHER PUBLICATIONS

The extended European search report dated May 30, 2018 for European application No. 17203616.2, 10 pages.
(Continued)

*Primary Examiner* — Rami Khatib
*Assistant Examiner* — Gabriel Joseph Rene Lambert
(74) *Attorney, Agent, or Firm* — Law Offices of Liaoteng Wang (57) ABSTRACT

The present invention provides an automatic train protection method, a vehicle on-board controller and a train based on vehicle-vehicle communication. The method includes: after a present train runs onto a main track, determining an OC with which the present train needs to establish communication; communicating, by the present train, with the OC to obtain train identifiers of all trains within the jurisdiction of the OC; respectively communicating, by the present train, with the train corresponding to each train identifier to obtain current running information of the train corresponding to each train identifier; identifying a front communication neighbor train of the present train; determining that no hidden train exists between the present train and the front communication neighbor train; and calculating current movement authority MA of the present train according to the (Continued)

current position information of the present train and of the front communication neighbor train.

12 Claims, 4 Drawing Sheets

(51) Int. Cl.
*B61L 23/34* (2006.01)
*H04W 4/70* (2018.01)
*B61L 21/10* (2006.01)
*B61L 3/00* (2006.01)
*B61L 27/04* (2006.01)

(52) U.S. Cl.
CPC ........... *B61L 25/023* (2013.01); *B61L 25/028* (2013.01); *B61L 27/0027* (2013.01); *B61L 27/04* (2013.01); *H04W 4/70* (2018.02); *B61L 25/025* (2013.01)

(58) Field of Classification Search
CPC .. B61L 25/028; B61L 27/0027; B61L 25/025; H04W 4/70
See application file for complete search history.

(56) References Cited

U.S. PATENT DOCUMENTS

| | | | | |
|---|---|---|---|---|
| 2003/0222180 A1* | 12/2003 | Hart | ................... | B61L 27/0038 246/167 R |
| 2008/0315044 A1* | 12/2008 | Stull | ................... | B61L 27/0005 246/5 |
| 2010/0299007 A1* | 11/2010 | Ghaly | ................... | B61L 3/221 701/20 |
| 2011/0172856 A1* | 7/2011 | Kull | ................... | B61L 21/10 701/19 |
| 2011/0238241 A1* | 9/2011 | Brady | ................... | B61L 25/048 701/19 |
| 2013/0218375 A1* | 8/2013 | Ning | ................... | B61L 27/0038 701/19 |
| 2014/0131524 A1* | 5/2014 | Grimm | ................... | B61L 15/0072 246/3 |
| 2014/0180509 A1* | 6/2014 | Goldman | ................... | B61L 27/0072 701/19 |
| 2016/0016596 A1* | 1/2016 | Naylor | ................... | B61L 15/0018 709/220 |
| 2016/0046308 A1* | 2/2016 | Chung | ................... | B61L 25/021 701/20 |
| 2017/0113707 A1* | 4/2017 | Ghaly | ................... | B61L 3/16 |
| 2019/0114914 A1* | 4/2019 | Gao | ................... | B61L 3/008 |
| 2020/0070859 A1* | 3/2020 | Green | ................... | G01S 17/58 |

FOREIGN PATENT DOCUMENTS

| | | | | |
|---|---|---|---|---|
| CN | 105392685 A | 3/2016 | | |
| CN | 105398476 A | 3/2016 | | |
| CN | 106515797 A | 3/2017 | | |
| CN | 106672018 A | 5/2017 | | |
| CN | 106672020 A | 5/2017 | | |
| CN | 107284471 A | 10/2017 | | |
| EP | 0822909 B1 | 9/2000 | | |
| JP | 2015033177 A | * | 2/2015 | ............. B61L 15/20 |
| WO | 2014102647 A1 | 7/2014 | | |

OTHER PUBLICATIONS

The Office Action dated Aug. 21, 2020 for Chinese application No. 201711123797.4, 28 pages.

* cited by examiner

AUTOMATIC TRAIN PROTECTION METHOD, VEHICLE ON-BOARD CONTROLLER AND TRAIN BASED ON VEHICLE-VEHICLE COMMUNICATION

CROSS-REFERENCE TO RELATED APPLICATION

This application is based on and claims priority to Chinese Patent Application No. 201711123797.4 filed on Nov. 14, 2017, which is incorporated herein by reference in its entirety.

FIELD OF THE INVENTION

The present invention relates to the field of train running control technology, and in particular to an automatic train protection method, a vehicle on-board controller and a train based on vehicle-vehicle communication.

BACKGROUND

A communication based train control (CBTC) system realizes two-way communication between a train and ground equipment in a wireless communication mode, getting rid of the constraint of realizing train running control with a ground track circuit as the media, and has become a mainstream in design of a signal control system for urban rail transit at present.

The traditional CBTC system based on moving block train-ground communication technology is mainly composed of an automatic train supervision (ATS) system, a data communication system (DCS), i.e. wireless transmission backbone network, a vehicle on-board controller (VOBC) and ground equipment. The ground safety equipment includes a zone controller (ZC), computer interlocking (CI), a trackside signaler, a trackside axle counter, a trackside transponder, and so on. The system is mainly subjected to ground control, the train registers with the ZC, actively accepts the control of the ZC and actively reports to the ZC, the ZC performs train sequencing according to the positions of the trains, calculates the adjacent relationship of the trains on the track, calculates the train movement authority (MA) for the back train according to the tail of the front train, and realizes the interaction of train-ground information through continuous train-ground two-way wireless communication so as to realize train tracking running in a moving block system based on target-distance. As the system is mainly subjected to ground control, much equipment are involved, the system structure is complex, the maintenance and upgrade of the system are quite difficult, the data interaction is cumbersome, and the data instantaneity is not high, thus affecting the train running efficiency.

A moving block control system based on vehicle-vehicle communication is an improvement and upgrading of the traditional CBTC system. In system architecture, the ZC and the CI are merged into the VOBC, only an object controller (OC) for controlling the trackside equipment is arranged on the trackside, the train obtains the position, the running speed and other information of the front train by means of direct communication between the front train and the back train, and the train calculates the MA of the train by itself, and controls the running of the train. The system achieves more flexible control of the train and improves the running efficiency of the train while greatly reducing the construction and maintenance costs of the trackside equipment. In the moving block control system based on vehicle-vehicle communication, as the trains calculates the MA of the present train by itself, therefore in the train tracking running based on the vehicle-vehicle communication, how to ensure the accuracy of calculating the MA of the train is an inevitable important problem for guaranteeing the efficient and safe running of the train.

SUMMARY OF THE INVENTION

The present invention provides an automatic train protection method based on vehicle-vehicle communication, a vehicle on-board controller and a train, by means of which the accuracy of calculating the MA of the train can be effectively guaranteed.

According to one aspect of the present invention, an automatic train protection method based on vehicle-vehicle communication is provided, including: after a present train runs onto a main track, determining an object controller OC in an area where the present train is located at present according to the current position of the present train, and determining an OC with which the present train needs to establish communication according to the distance between the current position of the present train and the next OC in the front direction of running of the present train, wherein the OC with which the present train needs to establish communication includes the OC in the area where the present train is located at present; communicating, by the present train, with the OC with which the present train needs to establish communication so as to obtain train identifiers of all trains within the jurisdiction of the OC with which the present train needs to establish communication; respectively communicating, by the present train, with the train corresponding to each train identifier so as to obtain current running information of the train corresponding to each train identifier, wherein the current running information includes current position information and a current running direction; identifying a front communication neighbor train of the present train according to the current running information of the present train and the obtained current running information of all trains; determining that no hidden train exists between the present train and the front communication neighbor train; and calculating, by the present train, current movement authority MA of the present train according to the current position information of the present train and the current position information of the front communication neighbor train.

According to another aspect of the present invention, a vehicle on-board controller is provided, the vehicle on-board controller installed on a train based on vehicle-vehicle communication, including: a communication OC determining module configured for: after a present train runs onto a main track, determining an object controller OC in an area where the present train is located at present according to the current position of the present train, determining an OC with which the present train needs to establish communication according to the distance between the current position of the present train and the next OC in the front direction of running of the present train, wherein the OC with which the present train needs to establish communication includes the OC in the area where the present train is located at present; a train identifier acquiring module configured for controlling the present train to communicate with the OC with which the present train needs to establish communication so as to obtain train identifiers of all trains within the jurisdiction of the OC with which the present train needs to establish communication; a train running information acquiring module configured for controlling the present train to communicate with the train corresponding to each train identifier so as to obtain current running information of the train corresponding to each train identifier, wherein the running information includes position information and a running direction; a front communication train identifying module configured for identifying a front communication neighbor train of the present train according to the current running information of the present train and the obtained current running information of all trains; a hidden train checking module configured for determining that no hidden train exists between the present train and the front communication neighbor train; and an MA calculating module configured for calculating current movement authority MA of the present train according to the current position information of the present train and the position information of the front communication neighbor train.

According to yet another aspect of the present invention, a train based on vehicle-vehicle communication is provided, including the vehicle on-board controller in the embodiment of the present invention.

BRIEF DESCRIPTION OF THE DRAWINGS

Other features, objectives and advantages of the present invention will become more apparent after reading the following detailed description of non-limiting embodiments with reference to the accompanying drawings, wherein identical or similar reference signs represent identical or similar features.

DETAILED DESCRIPTION

The features and exemplary embodiments of various aspects of the present invention will be described in detail below. In the following detailed description, numerous specific details are set forth in order to provide a thorough understanding of the present invention. It will be apparent, however, to those skilled in the art that the present invention may be practiced without the need for some of the specific details. The following description of the embodiments is merely for the purpose of providing a better understanding of the present invention by showing examples of the present invention. The present invention is not limited to any of the specific configurations or algorithms set forth below, but covers any modifications, substitutions and improvements of elements, components and algorithms without departing from the spirit of the present invention. In the drawings and the following description, well-known structures and techniques are not shown in order to avoid unnecessarily obscuring the present invention.

Figure 1:
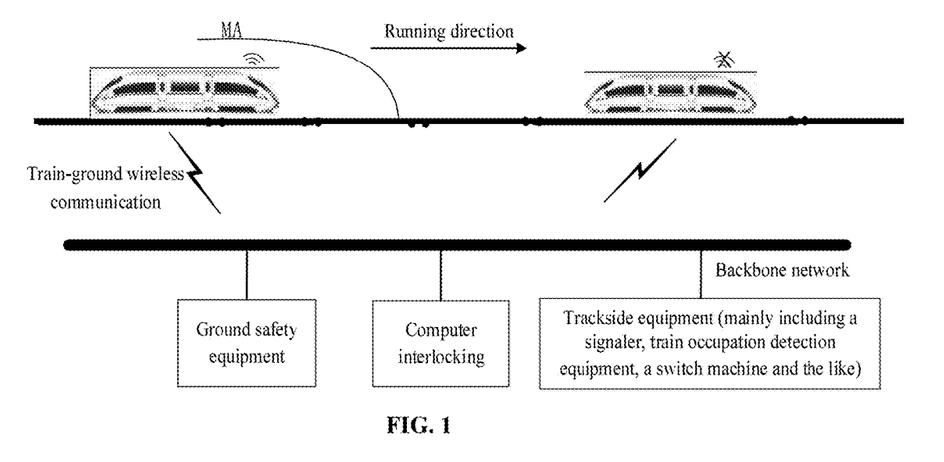
FIG. 1 is a schematic diagram of a train running scene in an existing traditional CBTC system.

FIG. 1 shows a train running structure diagram of a traditional CBTC system. In the system, train protection is mainly achieved by the cooperation between automatic train protection (ATP) equipment of VOBC and ground safety equipment, and the ATP equipment and the ground safety equipment interact data to enter a train running route. The ground safety equipment obtains a position block where the train is located according to the state of route detection equipment (an axle counter, a track circuit and the like), and when a non-communication train that cannot communicate with the ground safety equipment is on the running route, the non-communication train is manually driven according to the state of a signaler, a communication train behind the non-communication train performs safe tracking running according to the occupation condition (determined according to the occupation state of the axle counter) of the block. Therefore, train running data of the traditional CBTC system is mainly generated by the ground safety equipment, the train-ground communication requires a large amount of data interaction, and the instantaneity of the data is not high, thereby affecting the running efficiency of the train. In addition, when the non-communication train is on the router, the back train runs according to an axle counter state, thereby increasing the train tracking interval, and the train can only be driven by a driver after degradation, so that the speed is slow, and no safety protection measure is available.

In order to improve the running efficiency and running safety of the train, an autonomous train overspeed protection system based on vehicle-vehicle communication comes into being. The autonomous train overspeed protection system based on vehicle-vehicle communication is different from the previous way of calculating the MA of the train by the ground ZC; instead, the train autonomously accomplishes the MA calculation and the train overspeed protection. The present invention provides an automatic train protection method based on the autonomous train overspeed protection system based on vehicle-vehicle communication. By means of the method, the accuracy of the MA calculation of the train can be effectively improved, and the train running safety in the autonomous train overspeed protection system based on vehicle-vehicle communication is improved.

Figure 2:
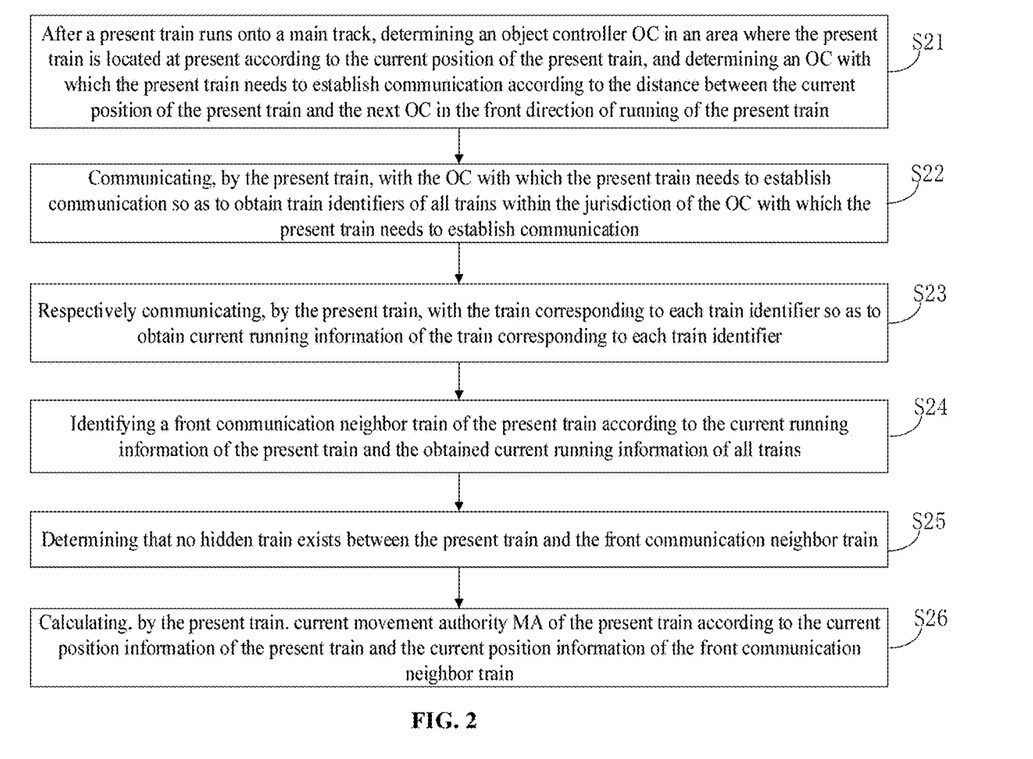
FIG. 2 is a schematic flow diagram of an automatic train protection method based on vehicle-vehicle communication in an embodiment of the present invention.

FIG. 2 shows a schematic flow diagram of an automatic train protection method based on vehicle-vehicle communication provided by an embodiment of the present invention. It can be seen from the figure that the automatic train protection method in the embodiment of the present invention can mainly include the following steps.

In step S21, after a present train runs onto a main track, an object controller OC in an area where the present train is located at present is determined according to the current position of the present train, and an OC with which the present train needs to establish communication is determined according to the distance between the current position of the present train and the next OC in the front direction of running of the present train.

In step S22, the present train communicates with the OC with which the present train needs to establish communication so as to obtain train identifiers of all trains within the jurisdiction of the OC with which the present train needs to establish communication.

In step S23, the present train respectively communicates with the train corresponding to each train identifier so as to obtain current running information of the train corresponding to each train identifier.

In step S24, a front communication neighbor train of the present train is identified according to the current running information of the present train and the obtained current running information of all trains.

The OC is route resource control and management equipment in the autonomous train overspeed protection system based on vehicle-vehicle communication and is configured for allocating, storing and updating route resources. The OC interacts with trackside equipment (a turnout switch machine, an axle counter, an emergency stop button and the like) to obtain the state information of the route resources in real time, such as an axle counter block occupation state, a turnout state, emergency stop button information, block information and the like. When the train enters the jurisdiction of the OC, the train needs to establish communication with the corresponding OC, report to the OC that the train enters the jurisdiction of the OC and report the identifier (ID) and other information of the train to the OC, and the OC stores a train ID list of all communication trains within its jurisdiction. While running, the train obtains the IDs of other trains through the communication with the OC, and accomplishes the interaction of the current running information of the train based on the vehicle-vehicle communication so as to accomplish the calculation of the MA of the train.

According to the automatic train protection method in the embodiment of the present invention, after the train runs onto the main track, the train firstly locates the train based on its own locating device, determines the OC where the train is located at present through an electronic map for train running and determines the OC with which the present train needs to establish communication according to the distance between the current position of the present train and the next OC in the front direction of running of the present train, the train communicates with the OC with which the present train needs to establish communication to obtain the train ID list of all on-track trains within the jurisdiction of the OC with which the present train needs to establish communication, establishes communication with the train corresponding to each train ID in the list, obtain the current running information of all trains in the list based on the vehicle-vehicle communication, and identify the front communication neighbor train in the front direction of running of the present train according to the current position information of the present train and the current position information of all trains in the list.

It needs be noted that the front direction and the back direction in the embodiment of the present invention are described with respect to the running direction of the train.

In the embodiment of the present invention, the OC with which the present train needs to establish communication includes the OC in the area where the present train is located at present, and may further include the next OC in the front direction of running of the train. Determining the OC with which the present train needs to establish communication according to the distance between the current position of the present train and the next OC in the front direction of running of the present train is to determine whether the OC with which the present train needs to establish communication includes the next OC with respect to the OC in the area where the present train is located at present, and the next OC is described in relation to the running direction of the train. The current running information includes current position information, a current running direction and other information. The current position information of the train includes, but not limited to a head position of the train and a tail position of the train.

In the embodiment of the present invention, determining an OC with which the present train needs to establish communication according to the distance between the current position of the present train and the next OC in the front direction of running of the present train includes: if the distance between the current position of the present train and the next OC in the front direction of running of the present train is greater than the set distance, determining that the OC with which the present train needs to establish communication does not include the next OC; and if the distance between the current position of the present train and the next OC in the front direction of running of the present train is not greater than the set distance, determining that the OC with which the present train needs to establish communication includes the next OC.

That is, whether the OC with which the present train needs to establish communication includes the next OC in the front direction of running of the train, in addition to the OC in the area where the present train is located at present, is determined according to the distance between the current position of the present train and the next OC in the front direction of running of the present train.

In the embodiment of the present invention, the above-mentioned preset distance is preferably the distance between the current position of the present train and the destination of the MA of the previous time of the present train.

Figure 3:
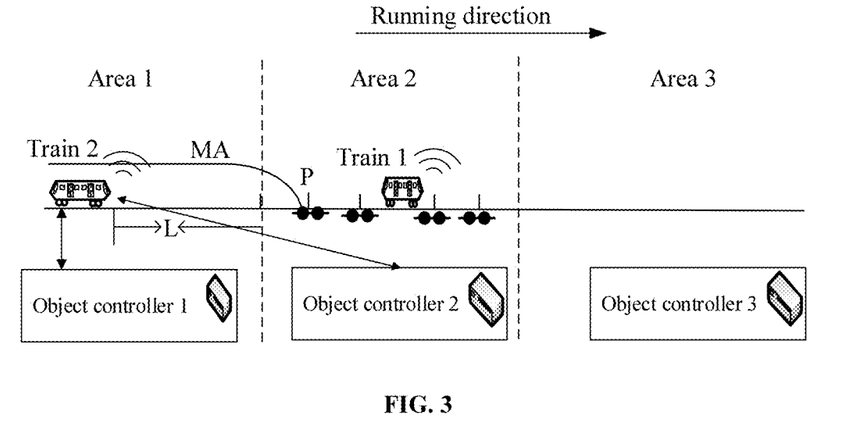
FIG. 3 is a schematic diagram of determining, by a train, an OC with which the train needs to establish communication in a specific embodiment of the present invention.

FIG. 3 shows a schematic diagram of determining the OC with which the train needs to establish communication by the train in a specific embodiment of the present invention. Three OCs are shown in the figure, the boundaries of the jurisdiction of the three OCs are denoted by dotted lines; that is, the jurisdiction of the OC1 (object controller 1) is an area 1, the jurisdiction of the OC2 is an area 2, and the jurisdiction of the OC3 is an area 3. During running of a train 2, it is determined that the area where the train is located at present is the area 1 by its own locating device, the OC1 is a train with which the train 2 needs to establish communication, and at this time, the train 2 also needs to confirm whether the OC2 is also an OC with which the train 2 needs to establish communication. In the specific embodiment of the present invention, the destination of the MA of the previous time of the train 2 is a point P, and as the distance L (the distance between the head of the train 2 and the boundary on one side of the area 2 close to the train 2) between the train 2 and the OC2 is smaller than the distance between the train 2 and the point P, the OC2 is an OC with which the train 2 needs to establish communication, that is, the OC with which the train 2 needs to establish communication includes the OC1 and the OC2.

In the embodiment of the present invention, all trains within the jurisdiction of the OC include: trains within the jurisdiction of the OC at present, trains on the boundaries of the jurisdiction of the OC and trains that may be located within the jurisdiction of the OC under preset conditions.

In practical application, the jurisdiction of each OC has been determined. In the embodiment of the present invention, the trains within the jurisdiction of each OC include all trains that may be located within the jurisdiction of the OC. The preset conditions include, but not limited to, emergency braking or backing of the train. At this time, the train may enter the jurisdiction of the OC in the front direction of running of the train or back to the jurisdiction of the OC behind the train.

In the embodiment of the present invention, when the distance between a train running on the track and the boundary, close to the train, of the jurisdiction of the OC in the front direction of running of the train running on the track is not greater than a second preset distance, the train running on the track communicates with the OC in the front direction of running of the train running on the track, and reports that the train enters the jurisdiction of the OC.

Taking the communication delay into account, when the train enters the jurisdiction of the next OC in the front direction of running of the train, when the distance between the train and the boundary of the jurisdiction of the OC is the second preset distance or smaller than the second preset distance, it needs to report to the OC that the train enters the jurisdiction of the OC, therefore when other trains communicate with the OC, it can ensure that the obtained trains within the jurisdiction of the OC contain all possible trains within the jurisdiction of the OC, thereby avoiding the situation that the trains that may already be in the jurisdiction of the OC do not report to the OC due to the communication delay.

In the embodiment of the present invention, the second preset distance can be set as a product of the highest running speed of the train and a preset time.

In a specific embodiment of the present invention, the preset time can be set as a sum of a time t1 of the OC to judge a communication fault of the train and a time t2 of the train to judge the communication fault of the OC, the second distance can be set as the farthest running distance S that the train can run within the t1+t2 time; it is assumed that the highest running speed of the train is Vmax, then S=Vmax× (t1+t2); and when the distance between the train and the boundary of the jurisdiction of the OC is S or smaller than S, it should be reported that the train has entered the jurisdiction of the OC.

A communication train running on the track needs to send a piece of communication detection information configured for detecting normal communication between the train and the OC to the OC with which the train establishes the communication, according to a preset time interval t, and similarly, the OC returns a piece of answer information to the train after receiving the communication detection information sent by the train. The OC can judge whether it is subjected to a communication fault with the train based on the communication detection information sent by the train, and if the OC does not receive the communication detection information sent by the train within a first set time, the OC determines there is the communication fault with the train. The train can judge whether it is subjected to a communication fault with the OC based on the answer information returned by the OC, and if the train does not receive the answer information returned by the OC within a second set time, the train determines there is the communication fault with the OC. The first set time is the t1, and the second set time is the t2. Generally, the t1 and the t2 are set as identical values and are generally integer multiples of the preset time interval t, if the t is 200 milliseconds, the t1 and the t2 can be set as 5 set time intervals, and if the OC does not receive the communication detection information sent by the train within a continuous 1 second, it indicates that the train is subjected to the communication fault.

In the embodiment of the present invention, before the present train runs onto a main track, the method may further include: subjecting the present train to non-communication train checking, and successfully passing the non-communication train checking, wherein the non-communication train checking is configured for inhibiting a non-communication train from running onto the main track.

In the embodiment of the present invention, the non-communication train refers to a train that cannot perform vehicle-vehicle communication with other trains, or a train that cannot communicate with the OC, and the non-communication train cannot autonomously accomplish the calculation of the MA of the train. The train that cannot perform vehicle-vehicle communication with other trains includes a train that is not upgraded (the train is not upgraded from the train in the traditional CBTC system to the autonomous train overspeed protection system based on vehicle-vehicle communication, namely a train provided with no vehicle-vehicle communication device), and a train provided with the vehicle-vehicle communication device but the vehicle-vehicle communication device is faulty.

According to the automatic train protection method in the embodiment of the present invention, before the train runs onto the main track, the train is subjected to the non-communication train checking, and can run onto the main track only after it is determined through the checking that the train is not the non-communication train, thereby ensuring that all trains running on the route are communication trains, and providing guarantee for mutual communication between trains communicate, calculation of the MA of the train based on the vehicle-vehicle communication, and the autonomous running protection of the train.

In the embodiment of the present invention, subjecting the present train to non-communication train checking may include: subjecting the present train to the non-communication train checking of a non-communication train detection device, wherein the non-communication train detection device includes a non-communication train detection area arranged between a transfer track and a main track entrance, train checking equipment configured for detecting whether the detection area is occupied, and an OC configured for determining whether a non-communication train exists in the detection area according to a detection result of the train checking equipment and train position information reported by a train.

Figure 4:
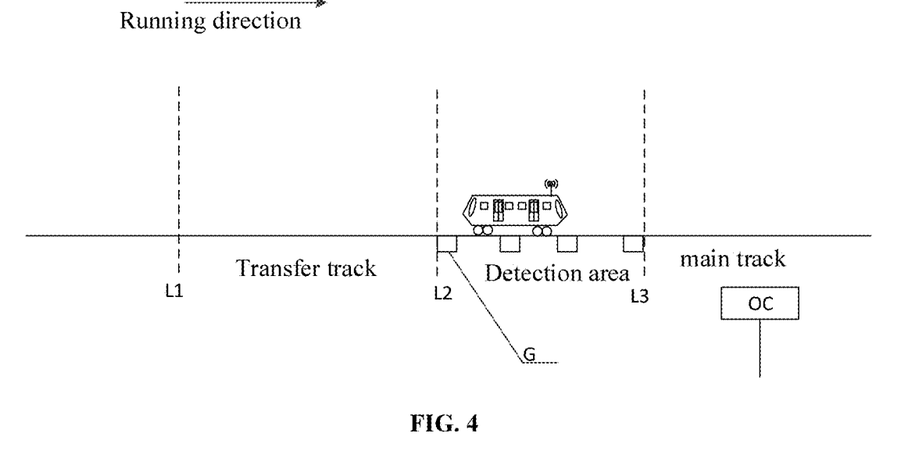
FIG. 4 is a schematic diagram of non-communication train checking before the train runs onto a main track in a specific embodiment of the present invention.

FIG. 4 shows a schematic diagram of non-communication train checking before the train runs onto a main track in a specific embodiment of the present invention. As shown in FIG. 4, the non-communication train detection area is located between a transfer track (a track between L1 and L2) and a main track (the track after L3 along a preset travelling direction), and the train checking equipment G can be a single axle counter, dual axle counter, ultrasonic, radar, video recognition or other equipment arranged in the non-communication train detection area and is configured for detecting the occupation condition of the non-communication train detection area, obtaining detection formation and sending the detection formation to the OC. The OC determines whether a non-communication train exists in the detection area according to the detection formation sent by the train checking equipment G and the train position information reported by the train within the jurisdiction of the OC (only the communication train will report its own position information to the OC), and if the detection formation indicates that the detection area is occupied, and it is determined that no train exists in the detection area according to the train position information, it is determined that the non-communication train exists in the detection area, at this time, the non-communication train checking of the train entering the detection area is not passed, on the contrary, if the detection formation indicates that the detection area is occupied, and it is determined that a train exists in the detection area according to the train position information, the train in the detection area is a communication train at this time, and the non-communication train checking is passed.

In the embodiment of the present invention, if the present train does not pass the checking, the OC in the non-communication train detection area needs to report to a train management platform TMC the information indicating that the detection area is occupied by the non-communication train, receive a blocking instruction of a main track entrance corresponding to the detection area issued by the TMC and block the main track entrance corresponding to the detection area.

In practical application, if the OC determines that the detection area is occupied by the non-communication train, the OC can block the area within the jurisdiction of the OC and notify the other trains beyond the area that the area is blocked, so that the other trains adjust the MA in time so as to ensure the travelling safety. During specific implementation, by reporting to the TMC the information indicating that the non-communication detection area corresponding to the OC is occupied by the non-communication train, the OC can achieve, by the TMC, blocking of the area within the jurisdiction of the OC.

In step S25, it is determined that no hidden train exists between the present train and the front communication neighbor train.

After the front communication neighbor train of the present train is identified, before the current MA of the present train is calculated, it should be determined that no hidden train exists between the present train and the front communication neighbor train, in order to ensure the correctness of calculating the MA and improving the train running safety.

In the embodiment of the present invention, the hidden train includes the non-communication train and a train with a faulty locating device.

The automatic train protection method in the embodiment of the present invention provides three solutions for checking the hidden train, and it can be determined that no hidden train exists between the present train and the front communication neighbor train as long as any one of the three solutions is satisfied. The three eliminating solutions are further illustrated below.

In the embodiment of the present invention, determining that no hidden train exists between the present train and the front communication neighbor train may include: communicating, by the present train, with the OC with which the present train needs to establish communication to be informed that a first axle counter block in the front direction of running of the present train is unoccupied, and determining that no hidden train exists between the present train and the front communication neighbor train if both of the distance between the head of the present train and an axle counter close to the present train in the axle counter block and the distance between the tail of the front communication neighbor train and an axle counter close to the front communication neighbor train in the axle counter block are smaller than a preset minimum train length.

The solution for checking the hidden train is a checking solution based on the axle counter and is suitable for the situation that the axle counter is on the train running route, the train checks the hidden train according the occupation condition of the axle counter so as to guarantee the safe upgrading of the train and the tracking running of the train.

Figure 5:
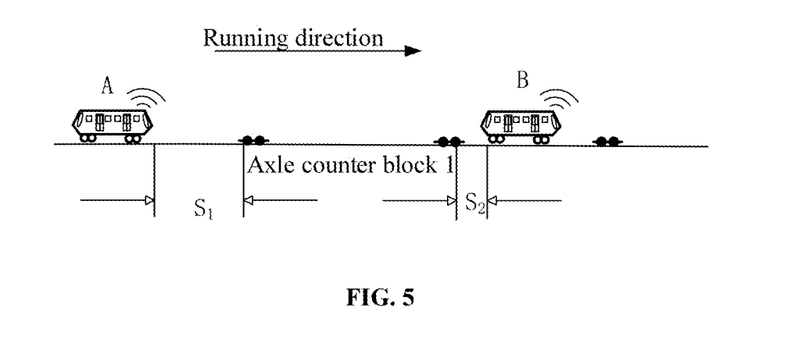
FIG. 5 is a schematic diagram of checking a hidden train based on an axle counter in a specific embodiment of the present invention.

As shown in FIG. 5, a train B is the front communication neighbor train of the train A, the train A communicates with ground equipment (OC) to learn that an axle counter block 1 in front of the train (the first axle counter block in the front direction of running of the train) is unoccupied, and if the distance S1 between the head of the train A and the front axle counter (the axle counter in the axle counter block 1 close to the train A) is smaller than the minimum train length, and if the train A can determine, according to the current position information of the train B obtained by communication with the train B, that the distance S2 between the tail of the train B and the axle counter block 1 is also smaller than the minimum train length, then it can be determined that no hidden train exists between the train A and the front communication neighbor train B, thus upgrading the train A itself, which is a necessary condition for the train A to run while tracking the train B.

In the embodiment of the present invention, determining that no hidden train exists between the present train and the front communication neighbor train may include: determining that no hidden train exists between the present train and the front communication neighbor train if the distance between the head of the present train and the tail of the front communication neighbor train is smaller than the minimum train length.

Figure 6:
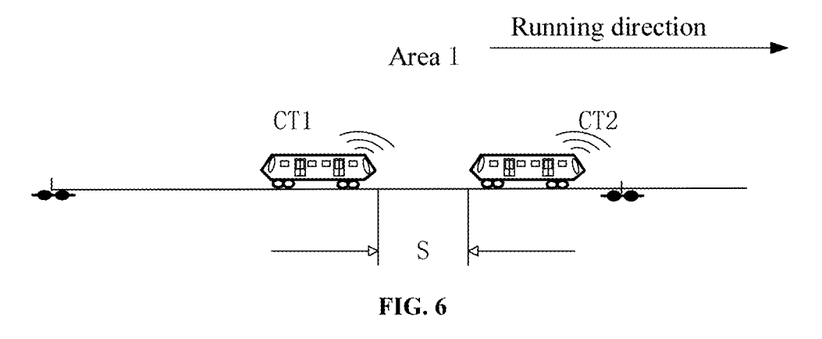
FIG. 6 is a schematic diagram of checking a hidden train based on an inter-train distance in a specific embodiment of the present invention.

The solution is a solution for checking the hidden train based on the distance between the trains. After the trains communicate with each other to exchange the position information, if the distance between the head of the present train and the tail of the front communication neighbor train is smaller than the minimum train length, the existence of the hidden train can be excluded. As shown in FIG. 6, the front communication neighbor train of the train CT1 is CT2, and the distance between the head of the CT1 and the tail of the train CT2 is smaller than the preset minimum train length Lmin, then no hidden train exists between the CT1 and the CT2.

In the embodiment of the present invention, if an active identification device is arranged on the present train, determining that no hidden train exists between the present train and the front communication neighbor train may include: determining that no hidden train exists between the present train and the front communication neighbor train when the active identification device identifies that no barrier exists in the front direction of running of the present train, and if the difference of the distance between the head of the present train and the tail of the front communication neighbor train from an identifiable distance is smaller than a first preset distance.

In the embodiment of the present invention, the second preset distance is equal to the difference between the preset minimum train length and a preset location error.

The solution is a solution for checking the hidden train based on the active identification technology. In the embodiment of the present invention, the active identification device is configured for judging whether a barrier exists in the front direction of running of the present train by obtaining an image in the front direction of running of the present train and according to the image in the front direction of running and a preset image identification algorithm, and calculating the distance between the barrier and the head of the train when the barrier exists. The barrier includes the non-communication train, and can also include other objects that affect the normal operation of the train.

In a specific embodiment of the present invention, the active identification device may mainly include an active identification part and a communication part. The active identification part obtains the image in the front direction of running of the train based on image sensor equipment and judges whether the barrier exists in the front direction of running of the present train based on the set image identification algorithm, and determines the distance between the barrier and the head of the train based on the obtained image when determining there is the barrier. The image sensor equipment can adopt one or more types of image collection equipment, such as one or more of a camera, laser radar equipment and millimeter wave radar equipment. The communication part can include a train locating unit and a communication unit, the train locating unit is configured for realizing rough locating of the train and calculating a running speed of the train, and the communication unit is configured for performing point-to-point communication with the communication units of the active identification devices of other trains in a preset communication mode and mutually transmitting the current running information of the train therebetween. In practical application, the specific implementation of the active identification device can be determined according to actual requirements.

Figure 7:
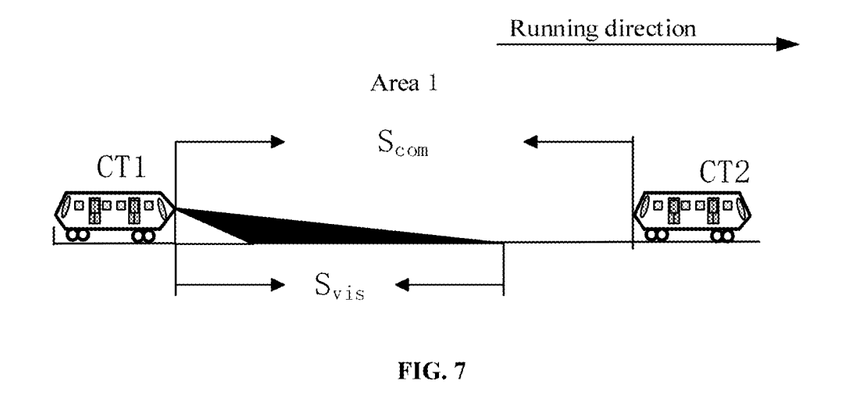
FIG. 7 is a schematic diagram of checking a hidden train based on an active identification device in a specific embodiment of the present invention.
Figure 8:
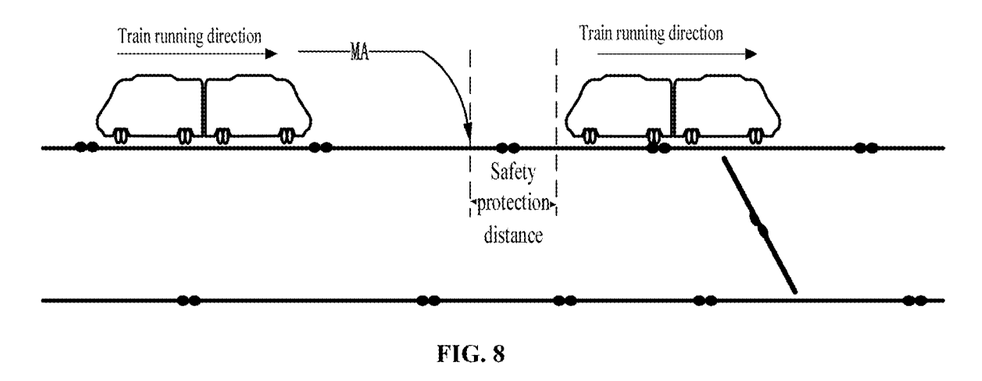
FIG. 8 is a schematic diagram of calculating, by the present train, MA of the train according to current position information of the present train and the current position information of a front communication train in a specific embodiment of the present invention.

FIG. 7 shows a schematic diagram of checking a hidden train based on an active identification device in a specific embodiment of the present invention. An area as denoted by a black triangle in the figure is an identifiable range in front of the active identification device. In the specific embodiment of the present invention, the front communication neighbor train of the CT1 is the CT2, the distance between the head of the CT1 and the tail of the CT2 calculated by the CT1 based on the position information of the CT2 obtained by communication with the CT2 is Scom, the identifiable distance of the active identification device is Svis, the sum of a calculation error of Scom and the identification error of the active identification device is Senor, the minimum train length is Lmin, and when Svis≥Scom−Lmin+Serror, that is Scom−Svis≤Lmin−Serror, it can be determined that no hidden train exists between the CT1 and the CT2.

In the embodiment of the present invention, the identifiable distance of the active identification device refers to the distance between the furthest point in the front direction of running of the train that can be identified by the active identification device and the head of the train.

The solution for checking the hidden train in the embodiment of the present invention mainly checks the hidden train in two modes, i.e. presence and absence of an axle counter on the train running route in the autonomous train overspeed protection system based on vehicle-vehicle communication. The MA of the present train is calculated after the checking of the hidden train in the front direction of running of the present train, thereby guaranteeing safe and efficient running of the train. If any of the three solutions for checking the hidden train in the embodiment of the present invention is successfully passed, it is deemed that the presence of the hidden train has been excluded.

In step S26, the present train calculates current movement authority MA of the present train according to the current position information of the present train and the current position information of the front communication neighbor train.

After the identification of the front communication neighbor train of the present train is accomplished, and after it is determined that no hidden train exists between the present train and the front communication neighbor train, the train can calculate the current MA of the present train according to the current position information of the present train and the current position information of the front communication neighbor train so as to provide data foundation for running of the present train while tracking the front communication neighbor train.

Figure 9:
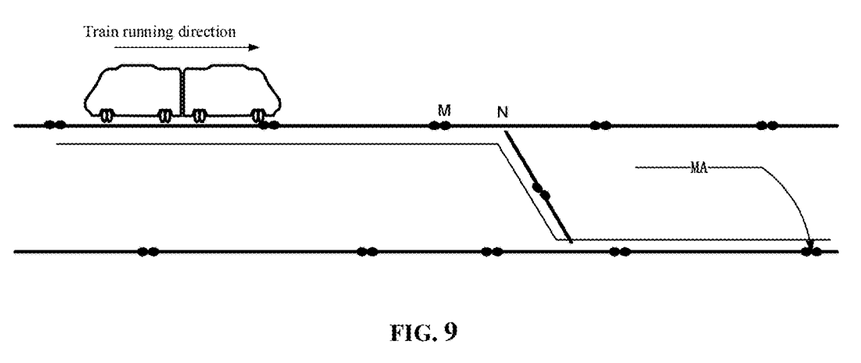
FIG. 9 is a schematic diagram of calculating the MA of the train when no train is in the front direction of running of the present train in a specific embodiment of the present invention.

In the embodiment of the present invention, when the present train calculates the current MA of the present train according to the current position information of the present train and the current position information of the front communication neighbor train, if the distance between the head of the present train and the tail of the front communication neighbor train is greater than a preset MA maximum value, the present train calculates the MA of the present train based on a single train running in the block (which means that only a single train is running in one block), and the MA can maximally extend to the MA maximum value. If the distance between the head of the present train and the tail of the front communication neighbor train is smaller than the MA maximum value, the destination of the MA of the present train is a preset safety protection distance (DISTANCE_MABACK) of the tail of the front communication neighbor train in the front direction of running of the present train, as shown in FIG. 9.

In actual application, if the present train learns that no train exists in the front direction of running of the present train after communicating with the OC with which the present train needs to establish communication, that is, the present train is the train running at the most front positions within the jurisdiction of the OC in the area where the present train is located at present, or the present train is the train running at the most front positions within the jurisdiction of the OC in the area where the present train is located at present and within the jurisdiction of the next OC, and at this time, the present train can determine the current MA of the present train according to whether the axle counter exists on the train running route.

Figure 10:
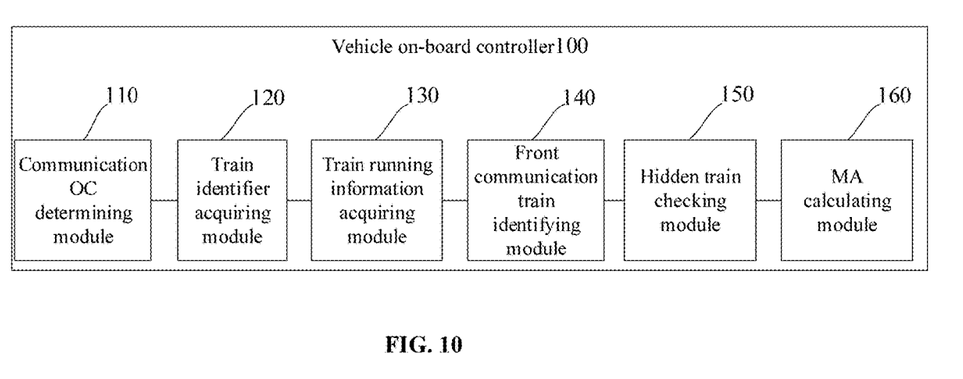
FIG. 10 is a structural schematic diagram of a vehicle on-board controller in an embodiment of the present invention.

As shown in FIG. 10, in the block with the axle counter (black dots shown in the figure are axle counters arranged on the track), the current MA of the present train is an axle counter block starting end (point M in the figure) of the closest occupied axle counter interval on the current safe route of the present train, or an unapplied turnout axle counter starting point (point N in the figure); and if no axle counter is occupied within the range of the safe route and the turnout has been blocked to a corresponding position, the destination of the MA should not be greater than the preset MA maximum value (the destination of the MA shown in the figure).

In the block without the axle counter, if the turnout has been blocked to the corresponding position within the range of the safe route, the destination of the MA of the present train should not be greater than the MA maximum value; and if the turnout is not blocked in place, the MA of the train only extends to the front side of the unblocked turnout.

In the embodiment of the present invention, the automatic train protection method may further include: if the active identification device identifies no barrier in the front direction of running of the present train, the present train calculates the current MA of the present train according to the identifiable distance of the active identification device; or if the active identification device identifies a barrier in the front direction of running of the present train, the present train calculates the current MA of the present train according to the distance between the barrier and the head of the present train calculated by the active identification device.

In the embodiment of the present invention, if the locating device of the train running on the track is faulty or the train is a non-communication train, the train can also calculates the MA of the train based on the active identification result of the active identification device installed on the train without converting the train into a manual-driving, speed-limiting mode, therefore the running speed of the train can be effectively improved on the basis of the ensuring the safe running of the train.

After the current MA of the present train is determined, the present train can control the safe running of the train according to the current MA and a train running overspeed safety protection principle. The train running overspeed safety protection principle aims at safely detecting whether the current allowable speed of the driver satisfies the safety limit in front of the train, and if not, the common braking or emergency braking of the train is triggered. After the present train determines the current MA of the present train, the present train controls the safe running of the train according to the current MA and the train running overspeed safety protection principle with reference of the train safe running control principle in the existing train control system, which will not be described herein in detail.

According to the automatic train protection method based on vehicle-vehicle communication of the present invention, the train can interact the current running information of the train based on the vehicle-vehicle communication and calculate its own MA information by the train itself, thereby guaranteeing the timeliness of the calculated MA. Before the train calculates its MA, the train firstly checks the hidden train, thereby guaranteeing the safety of the MA calculated. In addition, the active identification devices can also be installed on the head and the tail of the train, the train automatically identifies the information of the barrier on the track based on the active identification devices to further accomplish the autonomous protection of the train, and the train runs more safely. When the locating device of the train is faulty and cannot interact the current running information of the train with the other trains or is forced to be degraded due to some reason, the train can uses its active identification device for assisting the driving, the active identification device scans the route condition of the train running route in real time and returns route barrier information to the train to assist the running of the train, as opposed to the situation that the degraded train in the traditional CBTC completely depends on the deriver to perform manual limited speed driving.

Based on the automatic train protection method based on vehicle-vehicle communication provided by the embodiment of the present invention, the embodiment of the present invention provides a vehicle on-board controller, and the vehicle on-board controller is installed on a train based on vehicle-vehicle communication as shown in FIG. 10. It can be seen from the figure that the vehicle on-board controller 100 of the embodiment of the present invention can mainly include a communication OC determining module 110, a train identifier acquiring module 120, a train running information acquiring module 130, a front communication train identifying module 140, a hidden train checking module 150 and an MA calculating module 160.

The communication OC determining module 110 is configured for: after a present train runs onto a main track, determining an object controller OC in an area where the present train is located at present according to the current position of the present train, determining an OC with which the present train needs to establish communication according to the distance between the current position of the present train and the next OC in the front direction of running of the present train, wherein the OC with which the present train needs to establish communication includes the OC in the area where the present train is located at present.

The train identifier acquiring module 120 is configured for controlling the present train to communicate with the OC with which the present train needs to establish communication so as to obtain train identifiers of all trains within the jurisdiction of the OC with which the present train needs to establish communication.

The train running information acquiring module 130 is configured for controlling the present train to communicate with the train corresponding to each train identifier so as to obtain current running information of the train corresponding to each train identifier, wherein the running information includes position information and a running direction.

The front communication train identifying module 140 is configured for identifying a front communication neighbor train of the present train according to the current running information of the present train and the obtained current running information of all trains.

The hidden train checking module 150 is configured for determining that no hidden train exists between the present train and the front communication neighbor train.

The MA calculating module 160 is configured for calculating current movement authority MA of the present train according to the current position information of the present train and the position information of the front communication neighbor train.

In the embodiment of the present invention, the communication OC determining module 110 is specifically configured for: if the distance between the current position of the present train and the next OC in the front direction of running of the present train is greater than a set distance, determining that the OC with which the present train needs to establish communication does not include the next OC.

If the distance between the current position of the present train and the next OC in the front direction of running of the present train is not greater than the set distance, determining that the OC with which the present train needs to establish communication includes the next OC.

In the embodiment of the present invention, the set distance is the distance between the current position of the present train and the destination of the MA of the previous time of the present train.

In the embodiment of the present invention, the present train is a train passing non-communication train checking, and the non-communication train checking is configured for inhibiting a non-communication train from running onto the main track.

In the embodiment of the present invention, the present train specifically accepts the non-communication train checking of a non-communication train detection device, the non-communication train detection device includes a non-communication train detection area arranged between a transfer track and a main track entrance, train checking equipment configured for detecting whether the detection area is occupied, and an OC configured for determining whether a non-communication train exists in the detection area according to a detection result of the train checking equipment and train position information reported by a train.

In the embodiment of the present invention, the hidden train checking module 150 is specifically configured for: controlling the present train to communicate with the OC with which the present train needs to establish communication to be informed that a first axle counter block in the front direction of running of the present train is unoccupied, and determining that no hidden train exists between the present train and the front communication neighbor train if both of the distance between the head of the present train and an axle counter close to the present train in the axle counter block and the distance between the tail of the front communication neighbor train and an axle counter close to the front communication neighbor train in the axle counter block are smaller than a preset minimum train length; or determining that no hidden train exists between the present train and the front communication neighbor train if the distance between the head of the present train and the tail of the front communication neighbor train is smaller than the minimum train length; or determining that no hidden train exists between the present train and the front communication neighbor train if an active identification device on the present train identifies no barrier in the front direction of running of the present train, and if the difference of the distance between the head of the present train and the tail of the front communication neighbor train from an identifiable distance is smaller than a first preset distance.

In the embodiment of the present invention, the first preset distance is equal to the difference between the minimum train length and a preset location error.

In the embodiment of the present invention, the vehicle on-board controller is further configured for: when the distance between a train running on the track and the boundary, close to the train, of the jurisdiction of the OC in the front direction of running of the train running on the track is not greater than a second preset distance, communicating, by the vehicle on-board controller of the train running on the track, with the OC in the front direction of running of the train running on the track, and reporting that the train enters the jurisdiction of the OC.

In the embodiment of the present invention, the second preset distance is equal to a product of the highest running speed of the train and a preset time.

In the embodiment of the present invention, all trains within the jurisdiction of the OC may include: trains within the jurisdiction of the OC at present, trains on the boundaries of the jurisdiction of the OC and trains that may be located within the jurisdiction of the OC under preset conditions.

The embodiment of the present invention further provides a train based on vehicle-vehicle communication, including the vehicle on-board controller in any one of the above embodiments of the present invention.

The present invention may be implemented in other specific forms without departing from the spirit and essential characteristics thereof. Accordingly, the present embodiments are to be considered in all respects as illustrative and not restrictive, the scope of the present invention is defined by the appended claims rather than by the foregoing description, and all changes falling within the meaning and equivalents of the claims are included within the scope of the present invention.

What is claimed is:

1. An automatic train protection method based on vehicle-vehicle communication, comprising:
    after a present train runs onto a main track, determining an object controller OC in an area where the present train is located at present according to a current position of the present train, and determining an OC with which the present train needs to establish communication according to a distance between the current position of the present train and a next OC in the front direction of running of the present train, wherein the OC with which the present train needs to establish communication comprises the OC in the area where the present train is located at present;
    communicating, by the present train, with the OC with which the present train needs to establish communication so as to obtain train identifiers of all trains within a jurisdiction of the OC with which the present train needs to establish communication;
    respectively communicating, by the present train, with each of trains corresponding to the train identifiers so as to obtain current running information of each of trains corresponding to the train identifiers, wherein the current running information includes current position information and a current running direction;
    identifying a front communication neighbor train of the present train according to current running information of the present train and the obtained current running information of all trains;
    determining that no hidden train exists between the present train and the front communication neighbor train; and
    calculating, by the present train, current movement authority MA of the present train according to the current position information of the present train and the current position information of the front communication neighbor train.

2. The method of claim 1, wherein determining an OC with which the present train needs to establish communication according to the distance between the current position of the present train and the next OC in the front direction of running of the present train comprises:
    if the distance between the current position of the present train and the next OC in the front direction of running of the present train is greater than a set distance, the OC with which the present train needs to establish communication does not comprise the next OC; and
    if the distance between the current position of the present train and the next OC in the front direction of running of the present train is not greater than the set distance, the OC with which the present train needs to establish communication comprises the next OC.

3. The method of claim 2, wherein the set distance is the distance between the current position of the present train and the destination of the MA of a previous time of the present train.

4. The method of claim 1, wherein before the present train runs onto the main track, the method further comprises:
    subjecting the present train to non-communication train checking, and successfully passing the non-communication train checking, wherein the non-communication train checking is configured for inhibiting a non-communication train from running onto the main track.

5. The method of claim 4, wherein subjecting the present train to the non-communication train checking comprises:
    subjecting the present train to non-communication train checking of a non-communication train detection device, comprising:
        detecting, by train checking equipment in the non-communication train detection device, whether a non-communication train detection area arranged between a transfer track and a main track entrance is occupied; and
        determining whether the non-communication train exists in the detection area according to a detection result of the train checking equipment and train position information reported by a train within a jurisdiction of an OC for the detection area.

6. The method of claim 1, wherein determining that no hidden train exists between the present train and the front communication neighbor train comprises:

communicating, by the present train, with the OC with which the present train needs to establish communication to be informed that a first axle counter block in the front direction of running of the present train is unoccupied, and determining that no hidden train exists between the present train and the front communication neighbor train if both of a distance between the head of the present train and an axle counter close to the present train in the axle counter block and a distance between the tail of the front communication neighbor train and an axle counter close to the front communication neighbor train in the axle counter block are smaller than a preset minimum train length; or     determining that no hidden train exists between the present train and the front communication neighbor train if the distance between the head of the present train and the tail of the front communication neighbor train is smaller than the minimum train length; or     determining that no hidden train exists between the present train and the front communication neighbor train if an active identification device on the present train identifies no barrier in the front direction of running of the present train, and if a difference of the distance between the head of the present train and the tail of the front communication neighbor train from an identifiable distance is smaller than a first preset distance; and     the active identification device is configured for judging whether the barrier exists in the front direction of running of the present train by obtaining an image in the front direction of running of the present train based on image sensor equipment and according to the image in the front direction of running and a preset image identification algorithm.

7. The method of claim 6, wherein the first preset distance is equal to a difference between the minimum train length and a preset location error.

8. The method of claim 1, further comprising:

when a distance between a train running on the track and a boundary, close to the train, of the jurisdiction of the OC in the front direction of running of the train running on the track is not greater than a second preset distance, communicating, by the train running on the track, with the OC in the front direction of running of the train running on the track, and reporting that the train enters the jurisdiction of the OC.

9. The method of claim 8, wherein the second preset distance is equal to a product of the highest running speed of the train and a preset time.

10. The method of claim 1, wherein all trains within the jurisdiction of the OC comprise:

trains within the jurisdiction of the OC at present, trains on the boundaries of the jurisdiction of the OC and trains that may be located within the jurisdiction of the OC under preset conditions.

11. A vehicle on-board controller installed on a train based on vehicle-vehicle communication, the vehicle on-board controller comprising:

a processor; and a memory for storing instructions executable by the processor,     wherein the processor is configured for:

after a present train runs onto a main track, determining an object controller OC in an area where the present train is located at present according to a current position of the present train, and determining an OC with which the present train needs to establish communication according to a distance between the current position of the present train and the next OC in a front direction of running of the present train, wherein the OC with which the present train needs to establish communication includes the OC in the area where the present train is located at present;

controlling the present train to communicate with the OC with which the present train needs to establish communication so as to obtain train identifiers of all trains within a jurisdiction of the OC with which the present train needs to establish communication;

controlling the present train to communicate with the train corresponding to each train identifier so as to obtain current running information of the train corresponding to each train identifier, wherein the running information includes position information and a running direction;

identifying a front communication neighbor train of the present train according to the current running information of the present train and the obtained current running information of all trains;

determining that no hidden train exists between the present train and the front communication neighbor train; and     calculating current movement authority MA of the present train according to the current position information of the present train and the position information of the front communication neighbor train.

12. A train based on vehicle-vehicle communication, comprising the vehicle on-board controller of claim 11.

* * * * *